(12) United States Patent
Feichtinger et al.

(10) Patent No.: US 6,769,803 B1
(45) Date of Patent: Aug. 3, 2004

(54) CALIBRATION DEVICE FOR CALIBRATING OVEN TEMPERATURES

(75) Inventors: Heinrich Feichtinger, Hinteregg (CH); Rudolf Jussel, Feldkirch-Tosters (AT)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 10/417,716

(22) Filed: Apr. 17, 2003

(30) Foreign Application Priority Data

Feb. 25, 2003 (DE) .......................................... 103 07 933

(51) Int. Cl.[7] .................. G01K 17/00; G01K 11/06; G01K 5/00; H05B 1/02
(52) U.S. Cl. ................ 374/1; 374/45; 374/55; 374/160; 374/188; 219/201
(58) Field of Search ................ 374/1, 45, 55, 374/160, 188; 219/201; 432/120

(56) References Cited

U.S. PATENT DOCUMENTS

| | | | | |
|---|---|---|---|---|
| 4,882,293 A | * | 11/1989 | Naumann et al. | ............ 438/601 |
| 5,331,676 A | * | 7/1994 | Lambert et al. | ............ 376/260 |
| 6,135,633 A | * | 10/2000 | DiMarco et al. | ................ 374/1 |
| 6,303,059 B1 | * | 10/2001 | Foser et al. | .................. 264/16 |
| 6,384,382 B2 | * | 5/2002 | Rohner et al. | .............. 219/413 |

FOREIGN PATENT DOCUMENTS

| | | |
|---|---|---|
| CA | 2 334 575 A1 | 8/2001 |
| DE | 42 06 540 A1 | 9/1993 |
| DE | 100 08 603 A1 | 9/2001 |

* cited by examiner

*Primary Examiner*—Gail Verbitsky
(74) *Attorney, Agent, or Firm*—John C. Thompson; Alan S. Korman (57) ABSTRACT

A calibration device for performing a temperature calibration of the temperature in an oven, especially an oven adapted for thermal treatment of a dental product, includes at least one metallic

24 Claims, 6 Drawing Sheets

CALIBRATION DEVICE FOR CALIBRATING OVEN TEMPERATURES

CROSS-REFERENCE TO RELATED APPLICATIONS

This application claims foreign priority benefits under 35 U.S.C. §119(a)–(d) from German patent application ser. no. P 103 07 933.5 filed Feb. 25, 2003.

BACKGROUND OF THE INVENTION

The present invention relates to a calibration device for calibrating oven temperatures.

Ovens of the type commonly referred to as retort ovens are required for the production of dental ceramics. In the operation of such ovens, a pivotable oven hood is lowered in order to effect the uniform heating of the product to be heated. Rapid access to the heat treated product is made available via raising of the hood, so that this approach has proven its value.

The quality of the produced heat treated product, which may be, for example, in the form of a dental ceramic, is strongly dependent upon precise adherence to the prescribed heating curve—i.e, precise following of the temperature path. In this connection, the oven typically has a temperature sensor so that a control of the temperature is possible.

To be sure, the quality of the temperature path-following process is, naturally, only as good as the precision of the temperature sensor. In this connection, such retort ovens must be regularly re-adjusted and calibrated.

Moreover, with respect to such ovens deployed for dental product treatment, an exact calibration must be regularly undertaken with respect to numerous types of such ovens.

Numerous different approaches are known for effecting a calibration via simple means. For example, DE-OS 42 06 540 discloses an oven in which two thermo-elements are to be deployed in order to effect a calibration. Such thermo-elements are, to be sure, not precise.

Moreover, it is known from DE-OS 100 08 603, to use the melting points of gold and silver calibration wires as the calibration points. In this approach, a melt wire is provided whose melting interrupts a circuit, whereupon the melting temperature can be precisely captured or registered via a circuit a portion of which comprises the melt wire operating in the circuit as the calibration element.

Numerous other solutions are known in which at least two temperature points are to be registered in connection with a calibration. The suggested approaches are, however, comparatively expensive while nonetheless not being especially precise, in fact, in exactly those instances in which the melting wires are used as an opening contact or if a meltable metal is to actuate a closing contact. In both instances, the cohesion and adhesion of the melted metal must be accommodated, as such can exert an unfavorable influence on the contact opening process as well as the contact closing process.

It is no coincidence that the classical substances for temperature control are noble metals such as gold and silver. Aside from the benefit of having exactly defined melting points, these characteristics of such metals including, in particular, their chemical noble character, impart the property to these metals of having no tendency to form chemical compounds with the surrounding environmental atmosphere including, in particular, oxides.

In contrast, normal metals form top surface oxides at the high temperatures of a temperature calibration process, with the melting points of such top surface oxides usually lying well above the melting point of the metal so that the metal is effectively disposed in a significantly mechanically constrained and electrically insulated encasement, which considerably hinders establishing contact with the metal or effecting loss of contact with the metal.

These metal melt performance characteristics are even more disadvantageous in view of the fact that the noble metals comprise comparatively high melting points so that a calibration at low temperatures in, for example, the range of 600° C., should preferably be undertaken with the use of base metals such as, for example, aluminum. Aluminum would be fundamentally suitable for an exact temperature calibration, as the melting point of pure aluminum can be defined very precisely—namely, to 3 digit positions to the right of the decimal point. However, aluminum is a highly reactive metal whose use-beneficial characteristics reside in the fact that, even at room temperature, a protective layer of aluminum oxide forms thereon. While pure aluminum possesses a melting point of 660° C., the melting point of aluminum oxide lies above 2000° C. The mechanical cohesiveness of this thin oxide layer is, at 660° C., so high that the melted aluminum is constrained from flowing outwardly and, for this reason, is not capable of establishing contact solely under the influence of gravity (with, e.g., a switch contact) in the same manner as a noble metal.

In view of these problems that arise, it would be desirable to provide a cost-favorable calibration element which avoids the above-noted disadvantages.

SUMMARY OF THE INVENTION

The present invention provides a solution to the challenge of providing a calibration device which permits an exact temperature calibration with base metals as well as noble metals at, in particular, lower temperatures.

The inventive solution differs from the heretofore implemented fundamental concept—namely, the fundamental concept based upon movement of a calibration metal, once it melts as it reaches its melting temperature, solely under the influence of gravity to effect the opening or closing of a switch circuit. The inventive solution makes use of the change in volume which occurs during the phase change between the liquid phase and the solid phase of the metals, in that the inventive solution uses such metals as the means for opening or closing a switch contact of an electrical circuit. The forces which occur in connection with such a change in volume are substantially greater than the force of gravity. If one takes notice of the fact that, in an admittedly abnormal reaction, frozen water is in the position, without further assistance, to break a thick-walled glass bottle, it is easy to understand that melting aluminum is in the position, without further assistance, to bring to bursting its top surface thin-walled oxide coating.

In this connection, it is particularly advantageous, in connection with the present invention, that the establishment of contact with the switch contact requires a movement. During this movement itself, the tendency of the newly exposed aluminum top surface to form new oxide layers at the border surfaces with the air is at its lowest, whereby a secure establishment of contact is ensured.

In contrast to the continuous yet weak volume expansion which occurs over the entire temperature range, during a melting process there occurs a sudden and substantially stronger change in volume which, with respect to most metals, is an order of magnitude in the range of several percent of the volume. Aluminum is, in this regard, a special case with its volume increase of 7% and is, for this reason, especially well suited for configuring an inventive calibration device.

In connection with the present invention, it is especially advantageous if the housing of the calibration device possesses a resistance to pressure which is greater than the bursting pressure which effects the destruction of the oxide layer of the melt element during the melting process. The melt element, which can, for example, be formed of aluminum, experiences during a melt process an expansion of its volume. The pressure resistance of the housing causes the housing to channel the melt element, as it undergoes a volume expansion, toward a counter-contact so that, thereat, the pressure rises until it is larger than the top surface tension of the oxide layer. The oxide layer thus breaks apart so that the metallic aluminum is free to move. The invention is not limited to use of aluminum and/or silver. Rather, in lieu of these metals, suitable meltable metal coatings can be deployed, it being taken into account that such metals provide a precise melting point. Eutectic coatings comprise a precise melting point as such coatings have identical solid and liquid temperatures, as do pure metals.

There are also metals such as, for example, antimony, by which, during the melting thereof, a negative volume change occurs similar to that which occurs with respect to the anomalous behavior of water.

Additionally, such metals can also find use in the spirit of the present invention, since the inventive calibration device can be deployed for indicating decreasing or sinking temperatures as well as rising or increasing temperatures. In this event, instead of the establishment of a contact, the loss of a contact is produced and vice-versa.

Further advantages, details, and features are described in the hereinafter following description of five embodiments of the inventive device.

BRIEF DESCRIPTION OF THE FIGURES

FIG. 2b is a sectional view of the second embodiment of the calibration device shown in FIG. 2a;

DETAILED DESCRIPTION OF THE PREFERRED EMBODIMENTS

Figure 1A:
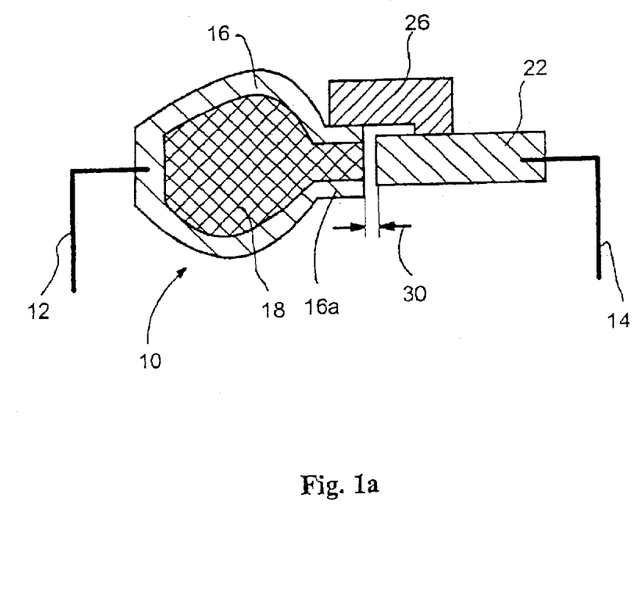
FIG. 1a is a sectional view of one embodiment of the calibration device, shown at an operational state before the reaching of the melting point.

FIG. 1a shows one embodiment of the calibration device of the present invention, designated as a calibration device 10, which comprises two connection wires 12 and 14, such wires being comprised in a circuit whose electrical resistance is measured.

A melt element 18, which is comprised, for example, of pure aluminum having a defined melt point, is substantially enclosed on all sides by a housing 16. This housing encloses the melt element 18 in a manner such that no free play room remains. The housing has an adequate stability but, as well, comprises a corresponding chemical stability in order to resist the mechanical and chemical attacks thereon by the melt element once the melt element melts into its fluid or liquid state. The housing 16 is, in the configuration shown in FIG. 1a, decidedly asymmetrically and irregularly configured, whereby it is to be understood that the form of the melt element and the housing are without criticality with respect to the present invention. Due to the bulge characteristic of the housing, a relatively large volume change is produced at the open neck of the housing which is configured in the region of a zone 16a.

It is to be understood that the housing 16 can, in lieu of the configuration illustrated herein, alternatively be comprised of a substantially bottle-shaped configuration as well as a beaker-shaped configuration. The housing can be comprised, preferably, of ceramic or metal such as, in particular, steel. A base 28 is formed at the side oppositely disposed to the neck or the opening channel 15 (see e.g. FIG. 3) of the housing, the base 28, in this configuration, being in connection with the connection wire 12. This configuration should be considered if the housing 16 is formed of metal, since such a configuration simultaneously provides the electrical contact between the melt element and the connection wire 12.

Figure 1B:
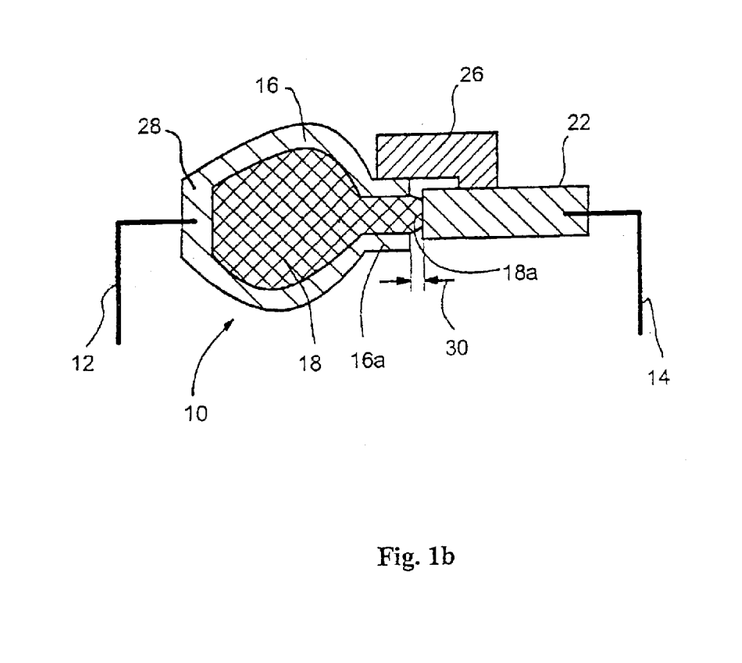
FIG. 1b is a sectional view of the calibration device shown in FIG. 1a shown at an operational time during or, respectively, after, a melt process.

Additionally, if the melt element 18, such as is illustrated in FIGS. 1a and 1b, comprises an irregular form, a housing having a thickened portion thereof on one side can be produced by the application of a layer onto the housing via a suitable layering process. In connection with the deployment of a metallic housing 16, this layer can be comprised of, for example, a galvanic layer of copper or chromium. In this connection, it is important that the melting point of the housing is greater than the melting point of the melt element 18.

The housing extends, in the area of the zone 16a, into its neck and comprises an opening channel 15 thereat through which the melt element 18 can expand during the melt process. The housing 16, which, as noted, may be formed of steel, thus has the purpose of permitting the volume increase resulting from a melt process to proceed solely in the direction of the opening of the zone 16a or, respectively, through the channel formed at the zone 16a.

An opposed contact 22 is disposed at a spacing from the zone 16a of the housing 16 in opposition thereto and is spaced therefrom by a switch distance or spacing 30. The switch spacing, in the illustrated embodiment, is predetermined or set by a retainer 26 which is comprised of an electrically non-conducting material, in particular, a ceramic. It is to be understood that the melting point of the retainer 26 is preferably, as well, greater than the melting point of the melt element 18. The configuration or shape of the retainer 26 plays no role with respect to the present invention. As is shown in FIGS. 1a and 1b, the retainer can be configured as a single piece, whereby it is also possible that the retainer can be configured in the configuration of several fingers or can, in the manner of a ring, encircle the opening zone 16a around all sides thereof.

FIG. 1b shows the condition of the melt element 18 upon reaching the melting point. Due to the expansion during melting, a portion of the melt element, here designated as the expansion volume 18a, has been pushed outwardly through the opening of the opening zone 16a and forms, under the influence of the top surface tension of the melt, a drop which comes into contact with a rear surface of the opposed contact 22. In this connection, a closing of the switch circuit is effected. The reduction in the electrical resistance resulting from the switch circuit closure is, via the connection wires 12 and 14, registered by the registration device. In accordance with the present invention, this reduction in electrical resistance is evaluated as an indication that the calibration temperature has been reached.

Figure 2A:
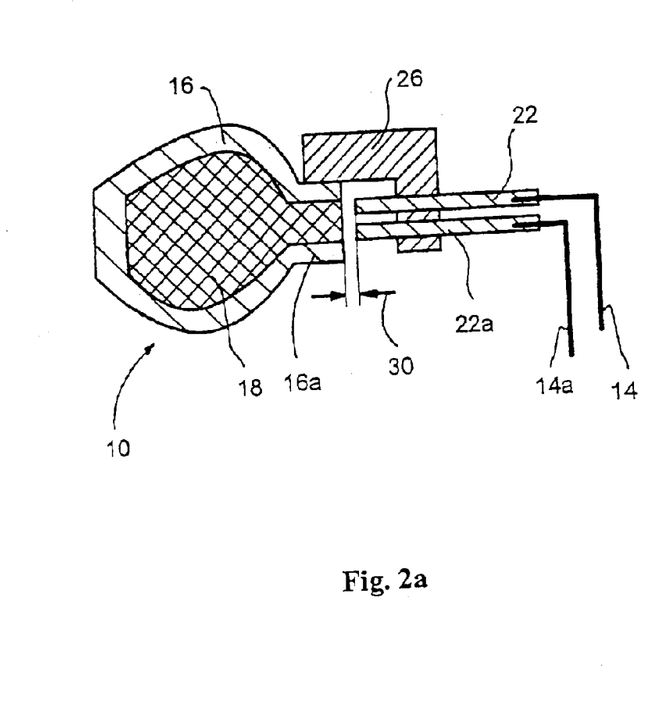
FIG. 2a is a sectional view of a second embodiment of the calibration device, which corresponds to the one embodiment of the calibration device shown in FIGS. 1a and 1b.
Figure 2B:
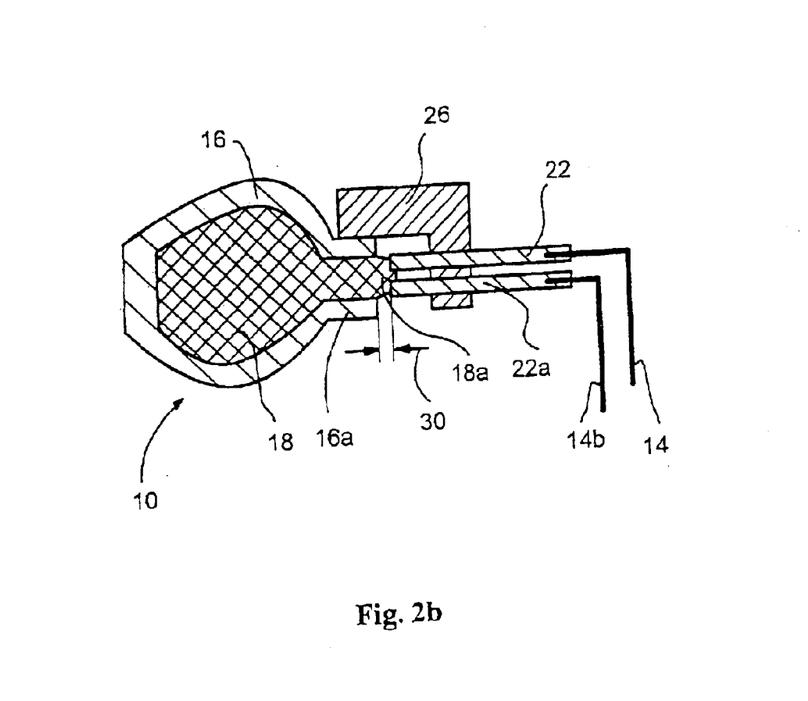

FIGS. 2a and 2b illustrate a second embodiment of the calibration device of the present invention, whereby identical reference numerals are used to designate identical components as have been described in connection with the one embodiment of the calibration device shown in FIGS 1a and 1b. An additional opposed contact 22a is provided in addition to the opposed contact 22. Both opposed contacts are disposed parallel to one another. This embodiment has the advantage that the thermal insulation of the connection wires can be simultaneously implemented so that the thermal losses are less. It is to be understood that, in lieu of this configuration, other preferred suitable configurations are possible for the arrangement of the connection wires and the corresponding contacts. For example, the opposed contacts can also be disposed in angularly offset positions relative to one another such as, for example, offset at 180° to one another. In accordance with the present invention, it is required, in any event, that the rear surfaces of both opposed contacts 22 and 22a are sufficiently proximate to the opening of the housing 16 so that, upon the expansion step, the melt element 18 comes into contact with both opposed contacts 22 and 22a.

FIG. 2b shows the contact establishing relationship, once the calibration device as shown in FIG. 2a has reached the melting point of the melt element 18. The expansion volume 18a extends outwardly of the opening of the opening zone 16a and establishes a contact to the opposed contacts 22 and 22a and, therefore, also establishes a contact between these opposed contacts. Both contacts are components of the inventive electrical circuit whose resistance is, in this manner, significantly reduced, whereby registration of the calibration temperature in accordance with the present invention via the measurement of electrical resistance is possible.

Figure 3:
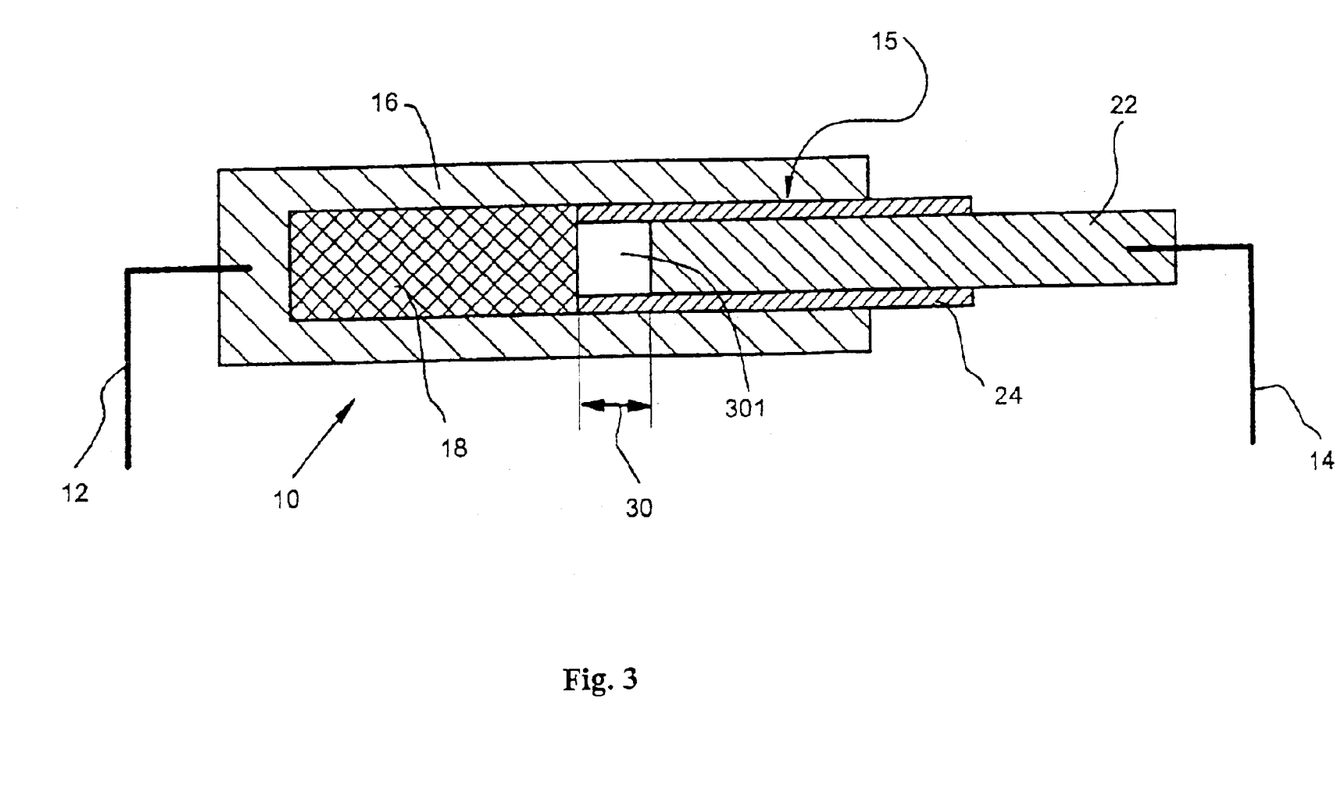
FIG. 3 is a sectional view of a third embodiment of the calibration device of the present invention which is especially suited for production as an industrially deployable calibration device.

FIG. 3 shows a third embodiment of the calibration device of the present invention which has shown its value in practice. The housing 16 is, in this embodiment, configured as a metal pipe formed, for example, of steel, and closed at one end. The melt element is mounted in the opening channel or the bore 15 of the housing 16 and is configured, for example, as a cylinder formed of pure aluminum whose diameter closely matches the diameter of the bore such that the melt element is received in a relatively close fit in the bore. By installing the cylinder into the bore in a manner which produces greater than de minimis friction between the cylinder and the bore, there occurs a scratching of the oxide layer which has formed around the circumference of the pure aluminum such that a secure contact with the therearound enclosing housing 16 is possible. Thereafter, a ceramic pipe 24 is inserted into the melt element 18 to serve as an electrically insulating separation layer in the bore at the rear side of the melt element 18. The opposed contact 22 is inserted into the ceramic pipe 24 to an extent such that, on its rear side, a switch spacing 30 exists between the rear side of the opposed contact 22 and the rear side of the melt element 18. Via this arrangement, a dead volume or dead space 301 is formed across the switch spacing 30 whose size is less than the size of the expansion volume 18a which is anticipated to be produced upon the melting of the melt element.

While, in connection with the embodiments shown in FIGS. 1a, 1b, 2a, and 2b, the top surface tension and, more specifically, the overcoming of the top surface tension, is responsible for the establishment of contact, it is the dead volume 301 in the embodiment shown in FIG. 3 which ensures that, during a melting process, contact is necessarily established. The presence of the switch distance between the melt element 18 and the opposed contact 22 is, in this embodiment, ensured by reason of the securement of the opposed contact 22 in the desired position within the ceramic pipe 24 via a temperature resistant securement.

Upon the melting of the melt element, there occurs an intensive volume expansion. The melt element 18 can only branch outwardly into the interior space of the ceramic pipe 24. The entire volume change correspondingly leads to an intensive length change in this area so that an abrupt establishment of contact with the opposed contact 22 is produced.

In accordance with the present invention, a further volume expansion does not lead to a bursting of the housing 16. Rather, it is preferred that the ceramic pipe 24 is so disposed in the housing 16 such that a corresponding exertion of force on the ceramic pipe due to further volume expansion causes displacement of the ceramic pipe.

In a modification of the embodiment of the calibration device, the housing 16 is, at its lower region, substantially thin-walled. The wall thickness is selected such that, upon melting, a secure establishment of contact with the opposed contact 22 results. Upon further heating of the wall of the housing 16, the wall behaves, in contrast, in the manner of a spring which maintains the contact while, nonetheless, permitting an expansion of the tube to compensate for the relatively greater thermal expansion coefficient of aluminum.

It is to be understood that other desired suitable measures can be deployed in order to ensure electrical contact including, as well, during further heating or thermal expansion.

Figure 4:
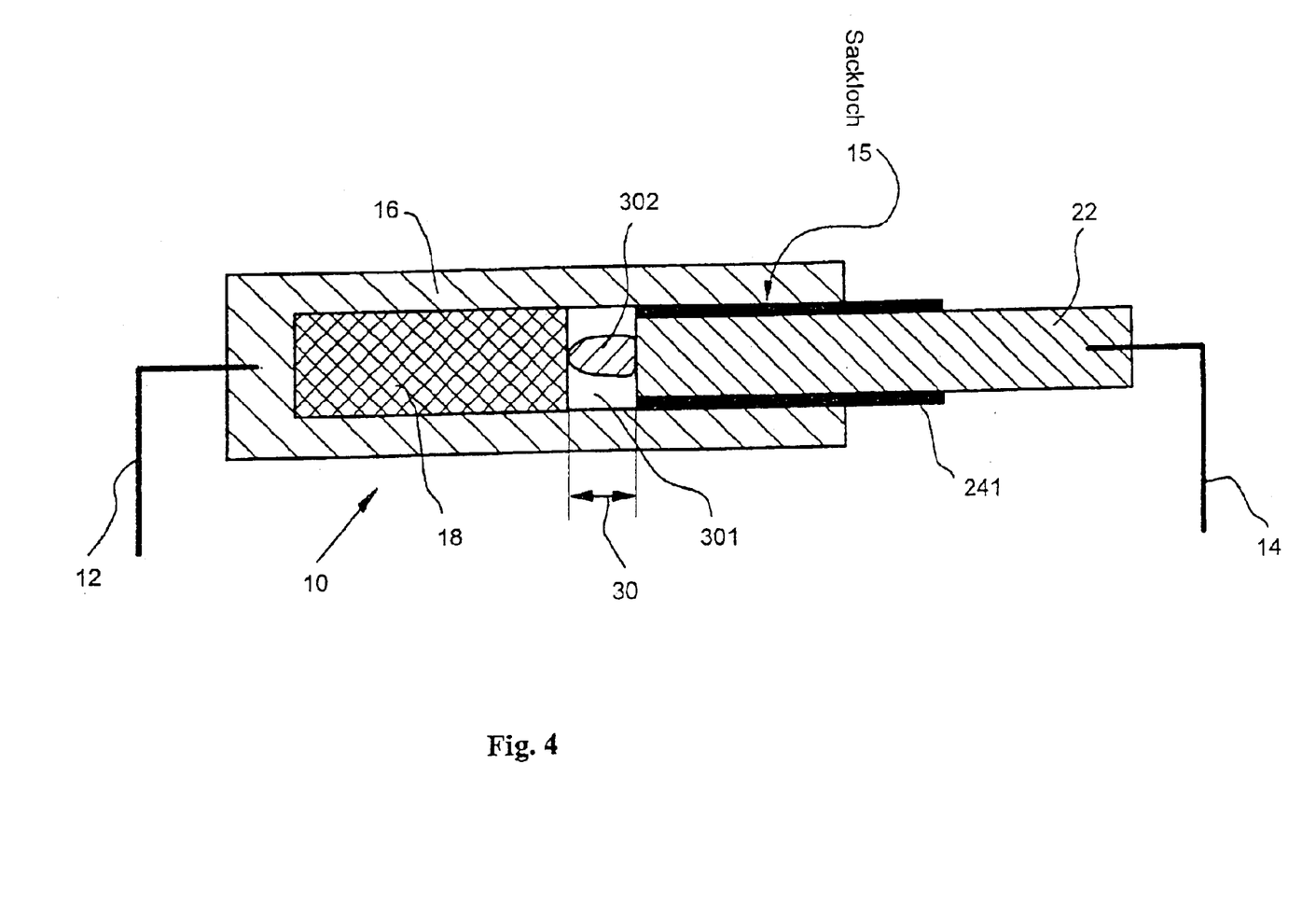
FIG. 4 is a sectional view of a fourth embodiment of the calibration device of the present invention which is especially suited for production as an industrially deployable calibration device.

FIG. 4 shows a fourth embodiment of the calibration device of the present invention. In this embodiment, the opposition contact 22 is electrically insulated from the housing 16 by a ceramic layer 241. The ceramic layer 241 has previously been produced, in that a 0.1 mm thick alumina layer has been applied via plasma spraying onto the sleeve surface of the opposed contact 22. In order to provide for reliable replicability, under industrial conditions, of the switch spacing 30, a distance-setting particle 302 formed of ceramic is, in a preliminary step, secured via a ceramic adhesion to the rear surface of the opposed electrode 22. In this manner, the opposed contact 22 is exactly positioned after the insertion thereof into the bore 15 and is secured in position via the ceramic securement.

The placement of the distance-setting particle 302 provides the additional advantage that the dead volume 301 can be still further reduced in size.

Figure 5:
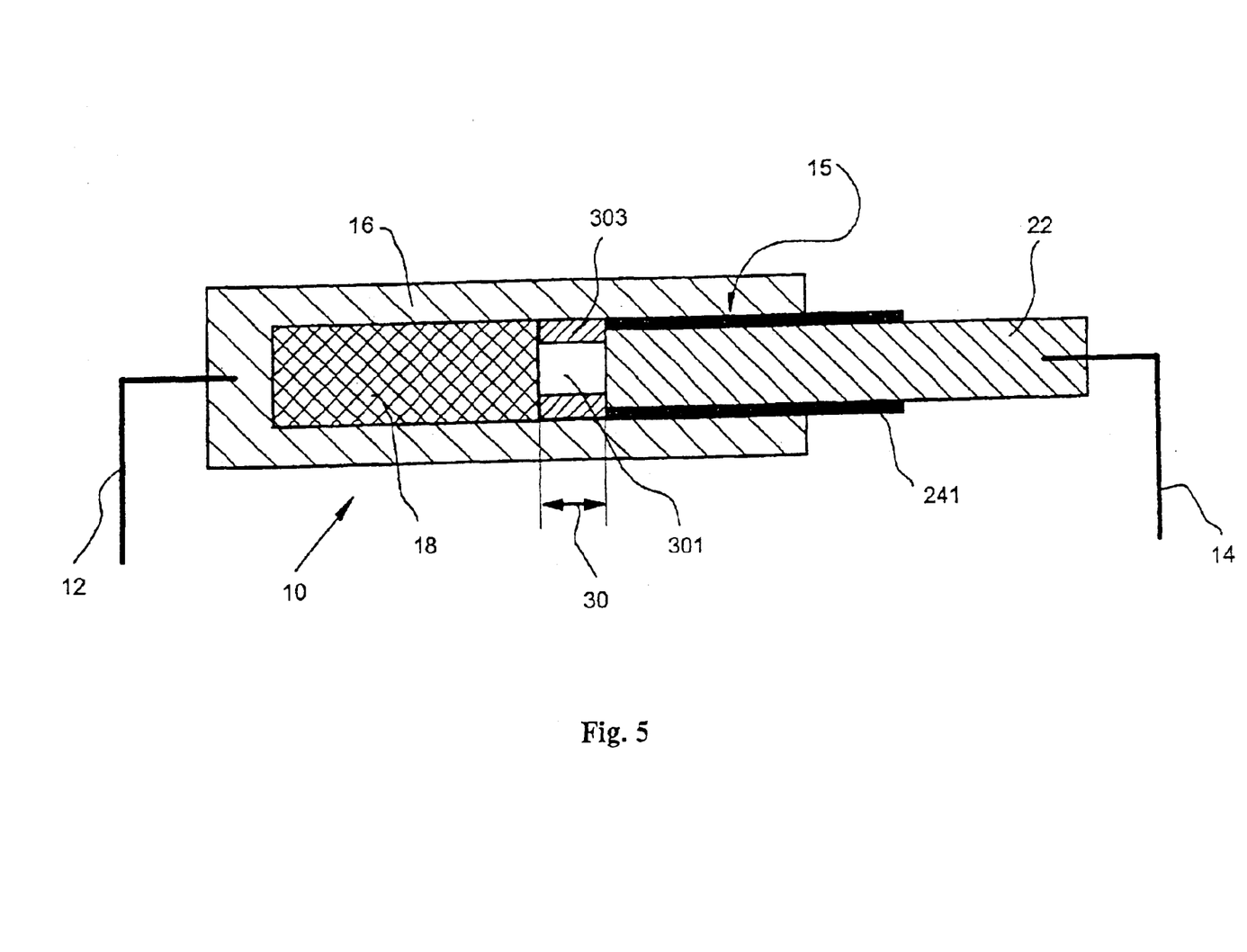
FIG. 5 is a sectional view of a fifth embodiment of the calibration device which is especially suited for production as an industrially deployable calibration device.

FIG. 5 shows a fifth embodiment of the calibration device. In contrast to the fourth embodiment of the calibration device shown in FIG. 4, in the embodiment shown in FIG. 5, a distance-setting ceramic pipe 303 is used in lieu of the distance-setting particle 302.

In the embodiments described with respect to FIGS. 1–5, the temperature calibration process proceeds with rising or increasing temperature. If it has been ensured that no reaction will occur between a fluidized or flowing melt element 18 and the housing, the calibration process can, however, also be employed with respect to decreasing or falling temperatures. Once the solidification temperature of the melt element has been reached, a sudden contraction occurs that leads to a loss of contact with the opposed contact 22. This process of loss of contact is particularly facilitated if the opposed contact is formed of a metal, which the melted portion of the fluidized melt element 18 only poorly wets.

Figure 6:
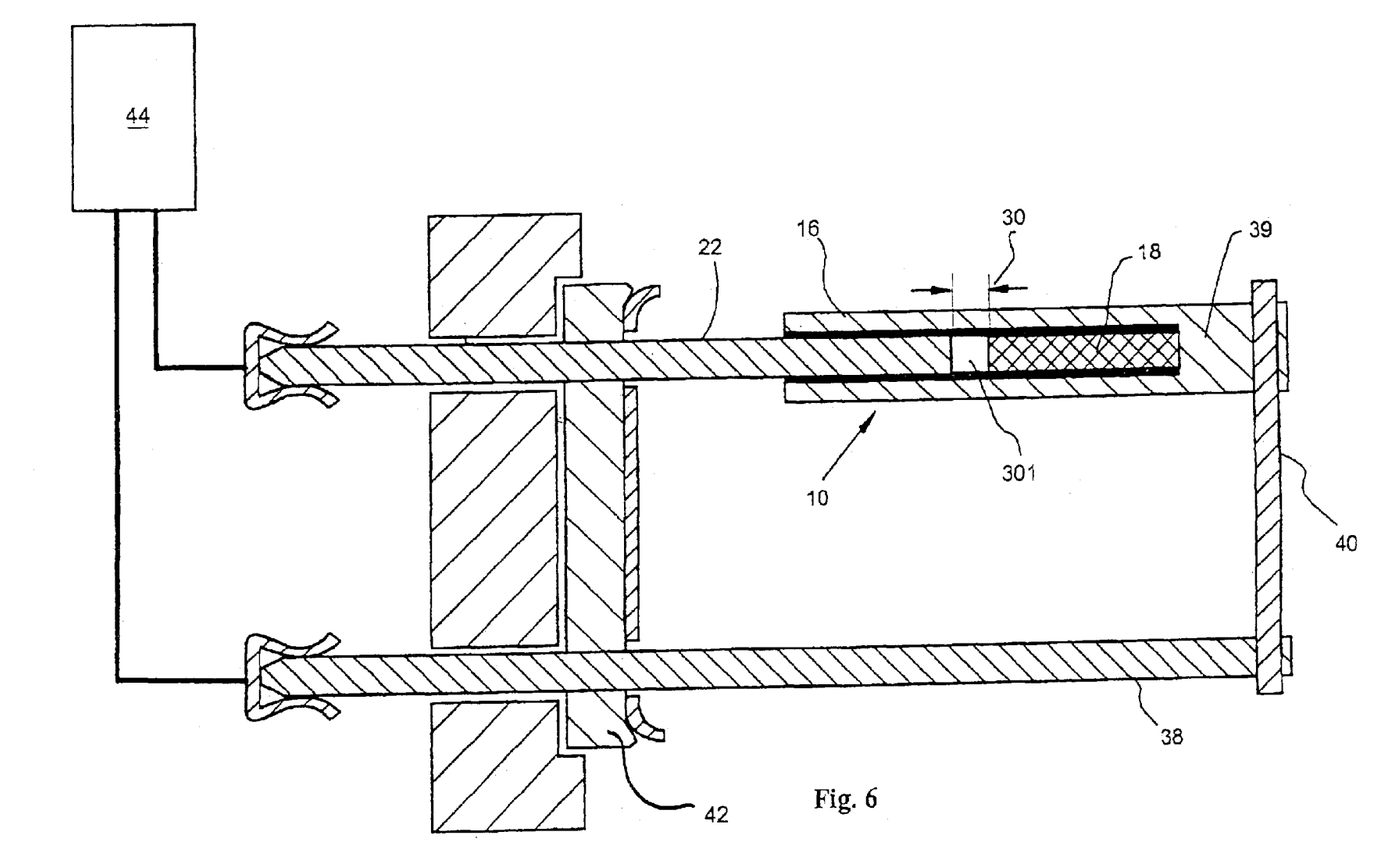
FIG. 6 is a sectional view of a combination of an embodiment of the inventive calibration device with a conventional temperature calibration device, whereby, via this combination, two temperatures can be exactly determined such that the combination is suitable for use in an inventive oven operable to prepare dental material.

FIG. 6 shows an arrangement in which a calibration device of the present invention is combined in an elegant manner with a conventional device for melt calibration, so that, during a calibration process, two calibration temperatures occurring one after the other in a short time can be controlled. In this regard, DE 100 08 603 A1 is fully incorporated by reference herein.

In the arrangement illustrated in FIG. 6, the opposed contact 22 of the inventive calibration device is fixedly connected via an electrically insulating retainer 42 with an electrode 38. The opposed contact 22 and the electrode 38 are inserted through two holes in the base of the oven space of an oven into two contact shoes of an electric circuit. The contact shoes are connected with a registration device 44 with which the resistance of the so-configured electric circuit is registered or measured.

The opposed contact 22 projects into a switch spacing defining a dead volume 301 in the bore of the housing 16. The electric insulation layer has, in this arrangement, previously been produced, in the form of a ceramic layer, on the inner side of the bore 15. Solely the closed end of the bore is left free of the electric insulation layer, so that the melt element 18 can take up electric contact with the housing 16.

The base or the end piece of the housing forms the electrode 39. A melt wire 40 is fixedly positioned between the electrode 39 and the electrode 38. If this wire is formed of silver and if pure aluminum is selected to form the melt element 18, then the following process occurs during a heating-up of the entire arrangement:

At low temperatures, the contact of the inventive calibration device is not closed, so that the switch circuit is open, even if the silver wire 40 is closed—i.e., is continuous between the electrode 39 and the electrode 38—for the reason that the melt element is not yet melted. As the temperature of the oven thereafter increases, there occurs, precisely upon reaching 660° C., a melting of the melt element 18, which is comprised of aluminum, and, consequently, the establishment of contact between the melted melt element 18 and the opposed contact 22 occurs. In this manner, the switch circuit is closed. The time point of the fall-off or drop in the electrical resistance is interpreted by the calibration device as the first calibration temperature of 660° C.

During the subsequent further heating-up of the oven beyond the melting temperature of aluminum, the contact provided by the melt element 18 is maintained. The fluidized or flowing aluminum expands still further, and this is not critical. Upon reaching of the melting temperature of silver in the range of approximately 960° C., a through melting of the silver wire 41 occurs, and consequently, a renewed opening of the switch circuit occurs. The electrical resistance thereupon rises at a steep slope rate and this rise is interpreted by the registration device as the second calibration temperature.

A registration of two exactly defined temperature points is, in accordance with the present invention, especially advantageous, as, in this manner, the rise of a temperature sensor in the range between the two calibration temperatures can be uniquely determined. In contrast, in connection with a single registration point calibration process, only the calibration temperature in the immediate temperature range is registered.

The present invention is, of course, in no way restricted to the specific disclosure of the specification and drawings, but also encompasses any modifications within the scope of the appended claims.

What is claimed is:

1. A calibration device for performing a temperature calibration of the temperature in an oven, especially an oven adapted for thermal treatment of a dental product, comprising:
   at least one metallic melt element having a defined melting point, the melting point being registerable by a registration device; and
   an opposed contact disposed at a spacing from the melt element, the melt element, in a solid condition thereof, undergoing a change in volume during a melt process in which the melt element melts from its solid condition into a liquid condition and at least a portion of the melted melt element expanding outwardly across the spacing into contact with the opposed contact, and the melt element, upon a re-solidification thereof in which the melt element changes from its liquid condition into its solid condition, contracting out of contact with the opposed contact.

2. A calibration device according to claim 1, wherein the melt element and the opposed contact are connected into a common switch circuit which comprises a portion of the registration device.

3. A calibration device according to claim 2, wherein the melt element and the opposed contact are integrated into a housing and the spacing of the opposed contact and the melt element in its solid condition comprises a switch spacing in the common switch circuit such that the common switch circuit is in an open condition due to the switch spacing.

4. A calibration device according to claim 1, wherein the opposed contact is supported in an insulation device which electrically insulates the opposed contact and, at the same time, supports the melt element and the opposed contact at the spacing from one another.

5. A calibration device according to claim 1, wherein at least one of solely the melt element and the melt element as well as the opposed contact are disposed in a housing comprised of at least a partially electrically insulating material.

6. A calibration device according to claim 1, wherein the melt element is disposed in a housing and, in particular, is disposed on a base of the housing and the opposed contact is disposed in opposition to the melt element.

7. A calibration device according to claim 5, wherein the housing includes an opening channel and the opposed contact is disposed exteriorly of the opening channel.

8. A calibration device according to claim 5, wherein the housing includes an opening channel in which the opposed contact is disposed.

9. A calibration device according to claim 5, wherein at least two opposed contacts are provided which are electrically separated from one another and disposed at a selected one of exteriorly of the opening channel and projecting into the opening channel.

10. A calibration device according to claim 2, wherein the melt element is disposed in a housing and, in particular, is disposed on a base of the housing, and the opposed contact is disposed in opposition to the melt element, the melt element extends from the base of the housing interiorly of the housing to partially fill the housing, and the melt element projects directly into contact with a connection wire of the switch circuit.

11. A calibration device according to claim 2, wherein the housing is configured with an at least partially electrically conducting configuration, the melt element is in electrical contact with the housing, and the housing is connected with the switch circuit.

12. A calibration device according to claim 6, wherein the opposed contact is at least partially enclosed in an electrically insulating enclosure or layer and, in particular, is at least partially enclosed in an electrode, and the electrically insulating enclosure or layer is at least partially formed on at least one of a sleeve surface of the opposed contact and the inner wall of an opening channel of the housing.

13. A calibration device according to claim 12, wherein the opposed contact projects into the opening channel and is supported therein by a conduit-shaped insulation element formed, preferably, of ceramic.

14. A calibration device according to claim 12, wherein the outer diameter of the electrically insulating enclosure corresponds to the interior diameter of the opening channel of the housing such that the electrically insulating enclosure is received in a relatively close fit in the opening channel and the dead volume extending between the melt element in its solid phase and the opposed contact is no greater than the volume into which the melt element extends upon melting thereof.

15. A calibration device according to claim 1, and further comprising at least one electrically insulating distance-setting element disposed between the melt element and the opposed contact, the distance element having an interior volume smaller than the total volume formed between the melt element, the opposed contact, and the wall of the housing.

16. A calibration device according to claim 15, wherein the total volume formed between the melt element, the opposed contact, and the wall of the housing, less the volume of the distance-setting element, is no greater than the volume into which the melt element extends upon the melting thereof.

17. A calibration device according to claim 1, wherein the melt element is disposed in a housing and, in particular, is disposed on a base of the housing and the opposed contact is disposed in opposition to the melt element, the melt element extends from the base of the housing interiorly of the housing to partially fill the housing, and the housing, in the portion thereof extending beyond the melt element in its solid phase includes a melt neck having a progressively decreasing diameter.

18. A calibration device according to claim 17, wherein the conduit is formed of quartz or ceramic and operates to provide electric insulation while, however, being temperature-stable.

19. A calibration device according to claim 1, wherein the melt element is formed of aluminum.

20. A calibration device according to claim 1, wherein the registration device is electrically connected with a second calibration device which comprises a second melt element that has, in particular, a high predetermined melting point higher than the melting point of the melt element of the first calibration device.

21. A calibration device according to claim 20, wherein the second melt element is formed of a noble metal, in particular, gold or silver.

22. A calibration device according to claim 20, wherein the melting of the first melt element at a first, lower calibration temperature and the melting of the second melt element at a second, relatively higher calibration temperature is registered by the registration device.

23. A calibration device according to claim 20, wherein the two melt elements are actuated in a serial manner and the first melt element operates as a closing contact and the second melt element operates as an opening contact, such that, during a rise in temperature, there is initially a closing of the switch circuit and, upon a further rise in temperature, there is an opening of the switch circuit.

24. An oven for heat treatment of dental material comprising:
   an oven volume for receiving therein a product to be subjected to heating by the oven; and
   a calibration device for performing a temperature calibration of the temperature in the oven volume, the calibration device including:
      at least one metallic melt element having a defined melting point, the melting point being registerable by a registration device; and
      an opposed contact disposed at a spacing from the melt element, the melt element, in a solid condition thereof, undergoing a change in volume during a melt process in which the melt element melts from its solid condition into a liquid condition and at least a portion of the melted melt element expanding outwardly across the spacing into contact with the opposed contact, and the melt element, upon a re-solidification thereof in which the melt element changes from its liquid condition into its solid condition, contracting out of contact with the opposed contact.

* * * * *